Figure 1:
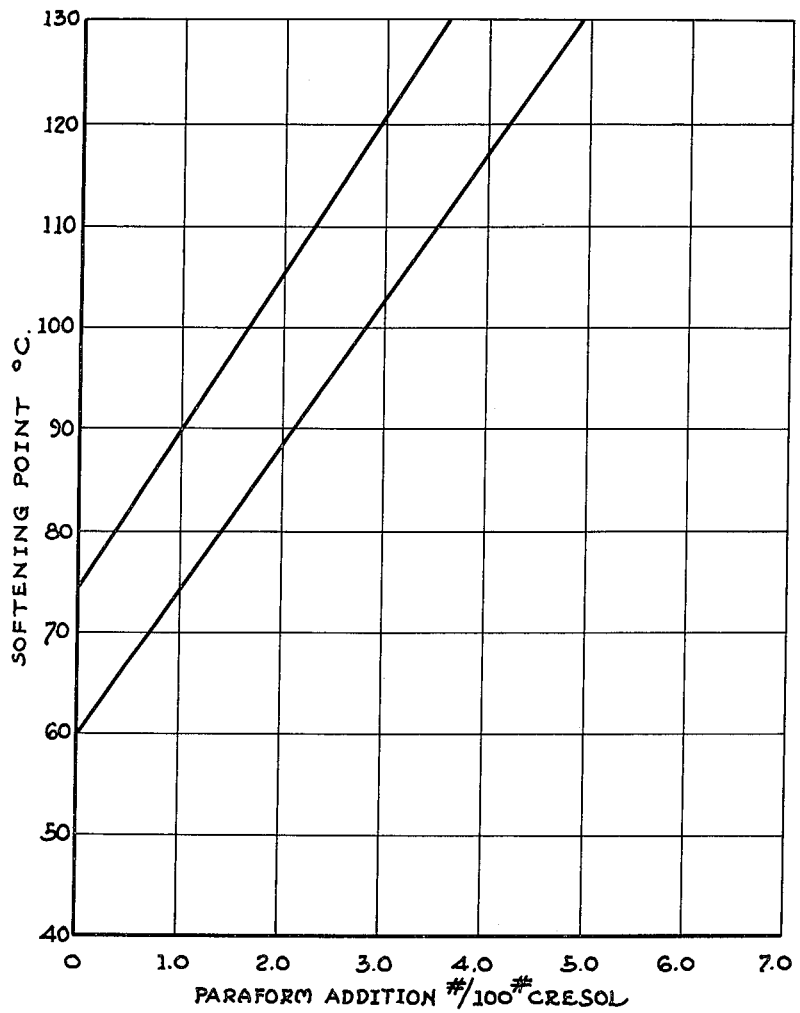

:::
United States Patent Office 3,005,797
Patented Oct. 24, 1961

3,005,797
RESINS OF CONTROLLED PROPERTIES
Barrymore T. Larkin, Slickville, and William E. St. Clair, Pittsburgh, Pa., assignors to Koppers Company, Inc., a corporation of Delaware
Filed Jan. 13, 1958, Ser. No. 708,518
3 Claims. (Cl. 260—57)

This invention relates to a method of producing resins of controlled properties.

Resins which are joined by the condensation of a monohydric phenol with an aldehyde, usually formaldehyed, and which cannot be transformed into the infusible, insoluable state by the application of heat (i.e., are permanently fusible or thermoplastic) are generally known as "novolak" resins. The condensation of the phenol and the aldehyde is generally carried out in the presence of a free acid catalyst, such as oxalic acid. Generally 0.6 to 0.8 mole of aldehyde, particularly formaldehyde, are used per mole of phenol.

Variations in the aldehyde phenol ratio changes the softening point of the resulting resin. This softening point of the resin is a measure of its viscosity and viscosity is a measure of molecular weight. Control of the softening point is desirable if the resin is to be modified as by etherification with an epoxy compound for such etherification may lower the softening point from fifteen to twenty degrees.

Difficulties have been experienced heretofore in attempting to control the softening point of such resins because when a molar excess of aldehyde to phenol be used, not all of the aldehyde will react with the phenol, and the excess is removed when the resin is isolated (this isolation of the resin is conventionally accomplished by vacuum distillation). Efforts have been made to sample the reaction mass as the condensation reaction proceeds and determine the free aldehyde content of the samples to ascertain the extent to which the aldehyde has reacted with the phenol. When the reaction has proceeded to the desired extent, devolatilization of the product is commenced. However, the aldehyde is soluble in the resin and tends to remain in the resin instead of distilling with the water. Thus, while the aqueous distillate may contain only about one percent of aldehyde, the resin may contain at least five percent of un reacted aldehyde. This residual aldehyde can be removed by vacuum stripping, and the catalyst can be neutralized prior to the vacuum stripping. Even with the catalyst neutralized, however, the free aldehyde continues to react although at a reduced rate during this vacuum stripping. Thus, it has been difficult to produce a novolak resin having a predetermined softening point.

An object of the present invention, therefore, is to provide a novel process for producing a novolak resin having a predetermined softening point.

It has now been found that a phenolic aldehyde resin can be prepared by condensing a phenol and an alehyde in the presence of a catalyst, thereafter removing the water from the resin, and then adding an aldehyde to the resin at rate no greater than the rate of reaction of the aldehyde with the phenol. It has been found that the softening point, or molecular weight, increases linearly according to the equation $$Ax + By = C$$

when

A, B, and C are constant
$x$ is the paraform addition
$y$ is the softening point as long as the rate of addition of aldehyde does not exceed the rate of reaction. If the addition of aldehyde exceeds the rate of reaction, aldehyde is apparently lost through volatization to render the predetermination of the softening point uncertain.

The single sheet of drawing illustrates the increase in softening points of resins in accordance with this invention.

Phenols and phenols having an alkyl group substituted ortho or para to the phenolic hydroxyl group suitable for the preparation of the resins of the present invention include o- and p-cresols, o- and p-ethyl phenols, o- and p-isopropyl phenols, o- and p-tert butyl phenols, o- and p-sec butyl phenols, and o- and p-amyl phenols, o- and p-octyl phenols, o- and p-nonyl phenols, and o- and p-alkyl resorcinols such as t-butyl, ctyl, and nonyl resorcinols.

As condensing agents any aldehyde may be used which will condense with the particular alkyl phenol being used, such aldehydes as formaldehyde, acetaldehyde, propionaldehyde, butyraldehyde, heptaldehyde, benzaldehyde, toluic aldehyde, naphthaldehyde, furfuraldehyde, glyoxal, acrolein, etc. or compounds capable of engendering such as para-formaldehyde, paraldehyde, trioxane hexamethylenetetramine, metaldehyde or any of the aldehydes above may be used in a solution form, such as the commercially available formalin. Also, mixtures of the above are effective; for economy in reaction time, mixtures of paraformaldehyde or other solid aldehyde engendering substances in aqueous formalin or other strong solution of aldehyde has been found effective.

The production of high softening point novalak resins is illustrated by the following examples:

Example I

To a 15 gallon reactor equipped with an agitator and a reflux condenser is added 50 pounds of o-cresol, 37.5 pounds of commercial 37% aqueous formalin and 0.7 pound of oxalic acid dihydrate. Over the period of an hour, the charge was heated to reflux and held under total reflux for an additional two hours. Thereafter, the reaction mass was stripped of volatile matter to a temperature of 110° C. The resulting resin had a softening point of 60° C. using the conventional ball and ring softening point (E28–51T). To this resin at 110° C. was added 2.1 pounds of paraform at the rate of 1.13 pounds of paraform per hour per 100 pounds of initial cresol charge in increments of 0.6 pound. The mass was sampled every fifteen minutes to obtain the values for curve A, FIG. 1. When the sampling showed a softening point of 120° C., a vacuum was applied to the mass and the devolatization carried out until the mass reached a temperature of 140° C. at 60 millimeters of mercury. The product in the reactor was then discharged and found to have a softening point of 120° C.

Example II

To a 50 gallon reactor equipped with an agitator and a reflux condenser is added 410 pounds of o-cresol, 308 pounds of 37% commercial formalin and 5.7 pounds of oxalic acid dihydrate. The charge was heated and in 2.7 hours brought to reflux temperature and maintained at total reflux for two hours. Thereafter the material was devolatilized at atmospheric pressure for 8.3 hours. The resulting resin had a softening point of 75° C. Then 13.7 pounds of paraform was added to the mass at 110° C. at the rate of 2.2 pounds per hours per 100 pounds of the initial o-cresol charge in increments of 0.6 pound. Samples were taken every fifteen minutes for curve B of FIGURE 1. The vacuum was then applied to the mass and the mass devolatilized until a temperature of 140° C. at 60 millimeters of mercury was reached. The product was discharged from the reactor and found to have a softening point of 120° C.

The foregoing has described the preparation of a resin having a high softening point by a novel process which will yield a resin having a desired softening point.

What is claimed is:

1. A process for substantially increasing the softening point of a novolak resin while maintaining the resin in its soluble, fusible form, said resin having been formed by the condensation in the presence of a free acid catalyst of a monohydric phenol and an aldehyde in the ratio of 0.6 to 1.0 mol of aldehyde per mol of phenol and from which the volatile matter has been removed, which comprises heating said resin to at least 110° C. and thereafter adding paraform to said resin at a rate such that the rate of addition does not exceed the rate of reaction until a soluble, fusible material capable of etherification having a softening point substantially higher than that of the resin is produced.

2. A process for the production of a soluble, fusible cresol-aldehyde resin having a substantially increased softening point which comprises condensing o-cresol and formaldehyde in the presence of oxalic acid dihydrate as a catalyst and in the ratio of 1 mol of cresol to 0.6 to 1.0 mol of formaldehyde, removing from said resin any material that is volatile at 110° C., thereby producing a resin having a softening point of 60–75° C., and thereafter adding paraform to said resin at 110° C. and at a rate such that the rate of addition does not exceed the rate of reaction of said resin and aldehyde until a soluble, fusible material capable of etherification is produced having a softening point substantially higher than that of the resin and of up to 130° C.

3. A process for the production of a cresol-aldehyde resin having a substantially increased softening point while maintaining said resin in its soluble, fusible form which comprises heating a charge of about 100 parts of ortho cresol, 75 parts of 37% aqueous formalin and 1.4 parts of oxalic acid dihydrate to reflux over a period of an hour and thereafter holding the charge under total reflux for two hours, then stripping the volatile matter from the charge by heating the charge to a temperature of 110° to produce a resulting soluble, fusible resin having a soften point of about 60° C., thereafter maintaining the resin at a temperature of 110° C. and adding 4.2 parts of paraform at the rate of about 2.3 parts per hour, and then devolatilizing the mass at a temperature of about 140° C. and under sub-atmospheric pressure, whereby the resulting soluble, fusible resin has a softening point of about 120° C. and is capable of etherification.

References Cited in the file of this patent

UNITED STATES PATENTS

| 1,020,593 | Aylsworth | Mar. 19, 1912 |
| 1,102,630 | Aylsworth | July 7, 1914 |
| 1,102,631 | Aylsworth | July 7, 1914 |
| 1,566,817 | Carter et al. | Dec. 22, 1925 |
| 1,727,076 | Melamed | Sept. 3, 1929 |
| 1,737,917 | Cherry | Dec. 3, 1929 |

FOREIGN PATENTS

| 23,088 | Australia | June 18, 1935 |
| 149,823 | Australia | May 18, 1950 |
| 485,415 | Canada | Aug. 5, 1952 |

OTHER REFERENCES

Ellis: The Chemistry of Synthetic Resins, Reinhold (1935), pages 285 and 314–331.

UNITED STATES PATENT OFFICE
CERTIFICATE OF CORRECTION

Patent No. 3,005,797　　　　　　　　　　　　　　October 24, 1961

Barrymore T. Larkin et al.

It is hereby certified that error appears in the above numbered patent requiring correction and that the said Letters Patent should read as corrected below.

Column 2, lines 21 and 22, after "engendering" insert -- aldehydes --.

Signed and sealed this 15th day of May 1962.

(SEAL)
Attest:

ERNEST W. SWIDER　　　　　　　　　　　　　　DAVID L. LADD
Attesting Officer　　　　　　　　　　　　　　Commissioner of Patents